July 3, 1956
W. B. FILIPIAK
2,752,720
CROSS LACED FISHING FLY BODY
Filed Dec. 5, 1952
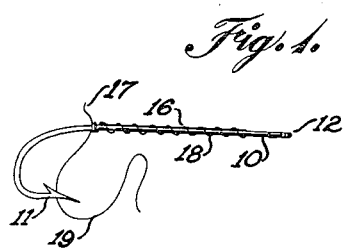
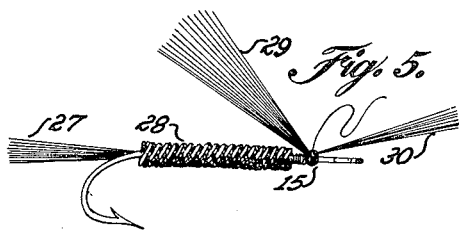
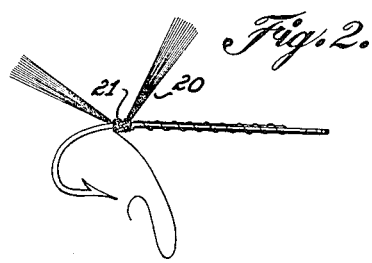
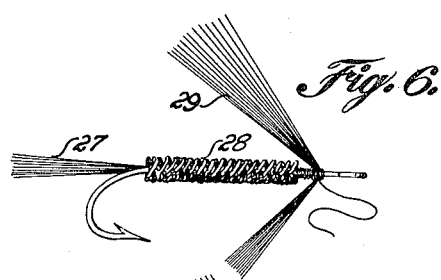
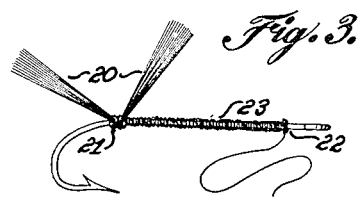
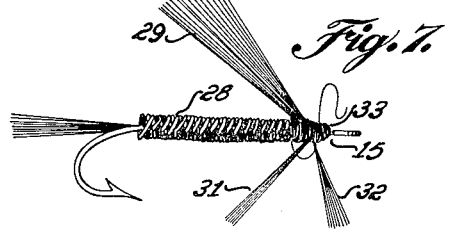
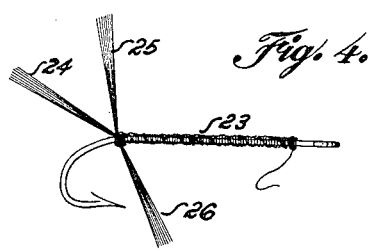
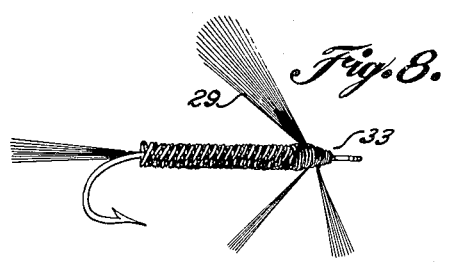
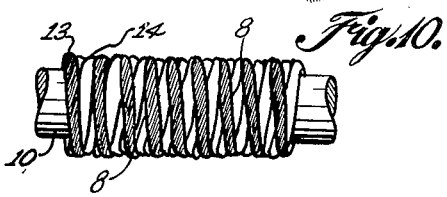
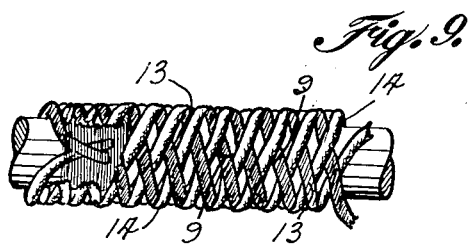
INVENTOR.
Walter B. Filipiak.
BY Victor J. Evans & Co.
ATTORNEYS

United States Patent Office 2,752,720
Patented July 3, 1956

---

2,752,720

CROSS LACED FISHING FLY BODY

Walter B. Filipiak, Chicago, Ill.

Application December 5, 1952, Serial No. 324,278

1 Claim. (Cl. 43—42.25)

This invention relates to fishing lures of the type used particularly in fly casting, and in particular a lure representing a bug in which nylon strands extend from a head at one end to represent wings and legs and also extend from the opposite end to represent a tail and in which the body portion between the head and tail is formed with cross laced strands of material of different colors thereby providing a transversely striped body.

The purpose of this invention is to provide an artificial fishing lure that resembles live bait and that is substantially indestructible.

Various attempts have been made to wrap shanks of fish hooks with strands of different types of materials to represent flies, caterpillars and other types of bugs, however, it has been found difficult to provide transversely disposed stripes of different colors with materials that make it possible to retain the stripes throughout the life of the lure. With this thought in mind this invention contemplates a lure formed on the shank of a fish hook with the shank wrapped with a layer of base strands, the ends of which are tied with a whip knot and wherein the base strands are wrapped with cross threads of different colors which provide alternating transversely disposed stripes and wherein strands of material representing wings, legs, and a tail are secured in position by the strands.

The object of this invention is, therefore, to provide means for wrapping the shank of a fish hook whereby a bug formed thereby is provided with a transversely striped body.

Another object of the invention is to provide an improved fishing lure wherein strands are wrapped around the shank of a fish hook and longitudinally disposed fibers, representing wings, feet, and a tail are secured to the shank by the strands wrapped around the shank of the hook.

A further object of the invention is to provide an improved fish hook having a striped body with wings, legs, and a tail extended therefrom, and which is of a simple and economical construction.

With these and other objects and advantages in view the invention embodies a fishing lure formed with threads wrapped around a shank of a fishing hook with the ends of the strands of the first layer tied with a whip knot and with fibers secured to the opposite ends of the shank with the strands wrapped around the shank providing wings, legs, and a tail, and wherein the outer layer of strands is formed with strands of different colors which provide transversely positioned stripes particularly on the under surface of the body of the lure.

Other features and advantages of the invention will appear from the following description taken in connection with the drawing, wherein:

Figure 1 is a view showing a fish hook with a nylon thread extended along the shank of the hook and with the thread wrapped over a straight strand and shank of the hook.

Figure 2 is a similar view showing fibers tied to the end of the hook with a whip knot, whereby the fibers are adapted to form the tail of a bug.

Figure 3 is a view similar to that shown in Fig. 2 except that the knot tying the fibers is covered with windings wrapped over the former threads and secured with a whip knot at the opposite end of the shank.

Figure 4 is a view similar to that shown in Fig. 3 with the body fibers separated in even bunches and with the thread windings covered with a suitable adhesive.

Figure 5 is a view showing the body windings covered with cross threads of different colors with the threads tied with a whip knot at the end of the shank of the hook on which the eye is positioned and showing wing and leg fibers secured to the hook with whip knots.

Figure 6 is a view similar to that shown in Fig. 5 showing the wing fibers separated and tied with a plurality of whip knots which hold the fibers in position.

Figure 7 is a view similar to that shown in Fig. 6 showing the fibers on the lower side of the hook separated to form the legs and showing the number of whip knots increased to form a head.

Figure 8 shows the relative positions of the tail, wings, and leg fibers and also shows the head formed at the end of the cross threads.

Figure 9 is a detail illustrating the method of forming the cross strands, the strands being crossed on the upper side of the shank of the hook.

Figure 10 is a view looking upwardly toward the under side of the shank showing the colors of the strands or threads alternating.

Referring more particularly to the drawing the improved fishing lure or bug of this invention includes a shank 10 of a fish hook having a barbed hook 11 on one end and an eye 12 on the opposite end and, as illustrated in Figs. 9 and 10 the shank is wrapped with cross threads of different colors as indicated by the numerals 13 and 14 and the threads are tied with whip knots 15. As shown in Figure 9, the numeral 9 indicates the criss cross portion of the threads, while in Figure 10 the numeral 8 designates the parallel portion of the threads.

The cross threads are formed by holding the hook with the shank stationary and with a thread of a different color in each hand the threads are crossed on the upper side of the shank, as shown in Fig. 9 and extend parallel on the under side as shown in Fig. 10. These threads may be wrapped in several layers to provide sufficient thickness for the body of the bug.

In forming the bug a straight section 16 of a thread 17 is extended along the shank 10 of the hook and, as shown in Fig. 1 the straight section 16 is held in position as loops 18 of an end 19 of the thread are wrapped around the shank and section 16. With the end or section 19 of the thread tightly wrapped around the shank the sections 19 and 17 are tied with a whip knot to retain the threads in position.

With the threads secured to the shank as shown in Figs. 1 and 2 fibers 20 are secured by whip knots 21 to the end of the shank from which the hook 11 extends and the section 19 is again wrapped over the turns or loops 18. The thread may be wrapped with as many layers as may be desired to provide the proper thickness and after the first wrapping is completed the strand is secured with a whip knot 22 to the opposite end of the shank. The wrapped portion of the threads may be covered with an adhesive, as indicated by the numeral 23.

This time the fibers 20 are separated to form bunches 24, 25, and 26 and these bunches are grouped together to form a tail 27, as shown in Fig. 5.

The body 28, shown in Figs. 5, 6, 7, and 8 is formed with cross threads of different colors providing stripes on the under surface of the body, as shown in Fig. 10.

With the body formed in this manner fibers 29, for the wings, are secured to the opposite end of the shank with whip knots as indicated by the numeral 15 and a portion of the fibers extend as indicated by the numeral 30.

By continuing the formation of whip knots the fibers 29 and 30 are brought into position to form wings and legs and, as illustrated in Fig. 7, bunches of the fibers are separated to form legs 31 and 32. In separating and retaining the wings and legs in the position shown in Fig. 7 the threads are provided with whip knots until a head, as indicated by the numeral 33 is formed.

In Fig. 8 the fibers 29 are shaped to form a wing or a pair of wings and the whip knots are sufficient to form a complete head 33.

The layers of threads or strands may be increased to provide sufficient bulk to the body and also to provide a head of a suitable size.

It will be understood that the body may be formed of colored strands of red and white, black and yellow, or of other suitable colors or combination of colors and the colored strands may be formed of suitable material.

By this means of forming fishing flies it is possible to use the exact amount of tails, legs and feelers, as desired.

From the foregoing, it is apparent that there has been provided a fishing lure which comprises a shank 10 having a hook 11 on one end and an eye 12 on the opposite end. The lure further includes fibers 29, 30, 31 and 32 which are mounted on the shank 10 to simulate the wings and legs of a bug, insect or the like, and fibers are wound on the shank 10 adjacent the eye 12 to form a tapered head 33 and also to secure the fibers 29 through 32 in position. The lure body on the shank 10 is formed of a first and second set of fibers 14 and 13, the first set of fibers being of a different color from the second set of fibers. As shown in Figure 9, the first and second sets of fibers are arranged so that on one side only of the shank 10, the fibers of the first set are arranged in criss cross relation with respect to the fibers of the second set. On the opposite side of the shank as shown in Figure 10 and as indicated by the numeral 8, the fibers of the first set are arranged in spaced parallel relation with respect to each other, and on the opposite side of the shank as shown in Figure 10, the fibers of the second set are arranged over the first set of fibers and in spaced parallel relation with respect to each other.

It will be understood that other modifications within the scope of the appended claim, may be made in the design and arrangement of the parts without departing from the spirit of the invention.

What is claimed is:

A fishing lure comprising a shank having a hook on one end and an eye on the opposite end, fibers mounted on said shank to simulate the wings and legs of a bug, insect or the like, fibers wound on said shank adjacent said eye to form a tapered head and to secure said first-mentioned fibers in position, and a lure body on said shank formed of a first and second set of fibers, said first set of fibers being of a different color from the second set of fibers, said first and second sets of fibers being arranged so that on one side only of the shank the fibers of the first set are arranged in criss cross relation with respect to the fibers of the second set, while on the opposite side of the shank, the fibers of the first set are arranged in spaced, parallel relation with respect to each other, and on said opposite side of the shank, the fibers of the second set are arranged over the first set of fibers and in spaced parallel relation with respect to each other.

References Cited in the file of this patent:

UNITED STATES PATENTS

| | | |
|---|---|---|
| 373,959 | Beckford | Nov. 29, 1887 |
| 377,027 | Green et al. | Jan. 31, 1888 |
| 2,034,832 | Raycraft | Mar. 24, 1936 |
| 2,087,303 | Rosch et al. | July 20, 1937 |
| 2,217,826 | Van Laer | Oct. 15, 1940 |
| 2,533,523 | Sivey et al. | Dec. 12, 1950 |
| 2,586,719 | Ross | Feb. 19, 1952 |

OTHER REFERENCES

The Wise Fishermen's Encyclopedia, page 456, Fig. 11. Published 1951 by Wm. H. Wise and Co., Inc., New York, N. Y.